Dec. 8, 1964    M. M. MOYER    3,160,033
DRILL HEAD
Filed Sept. 19, 1962    3 Sheets-Sheet 1
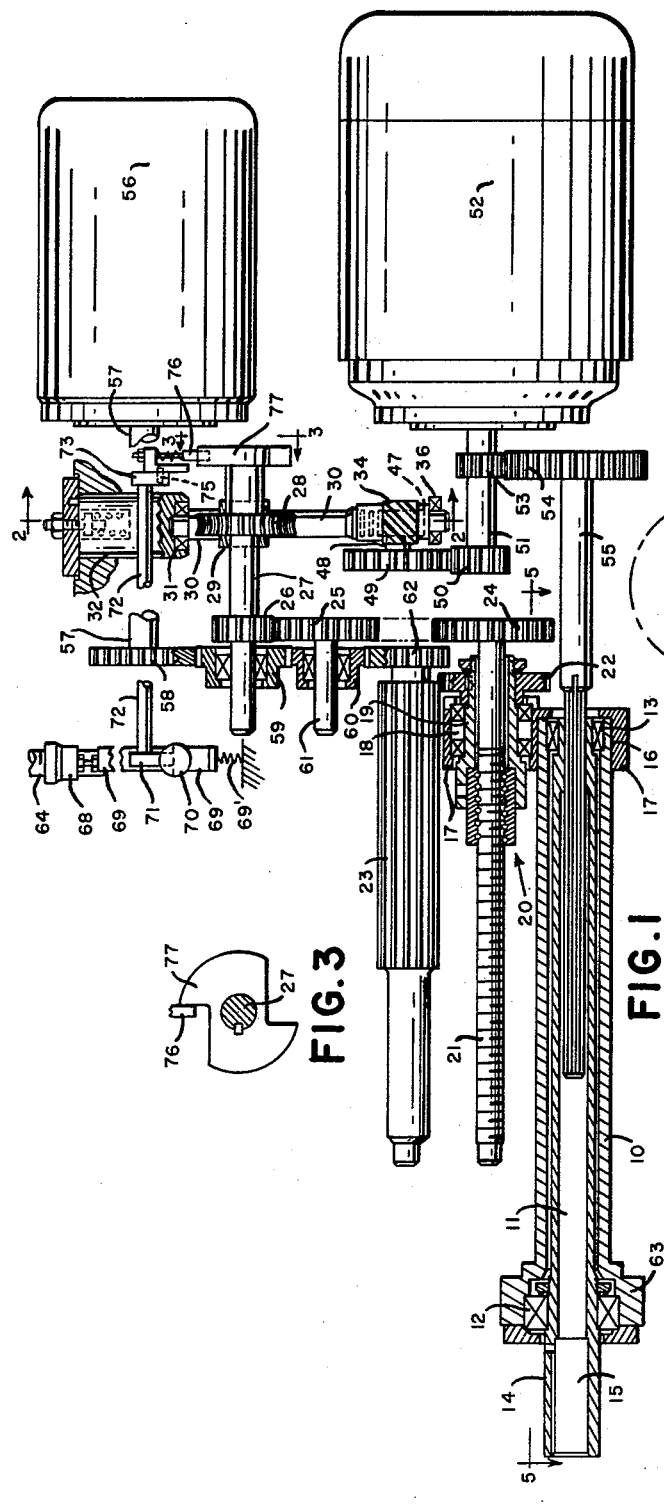
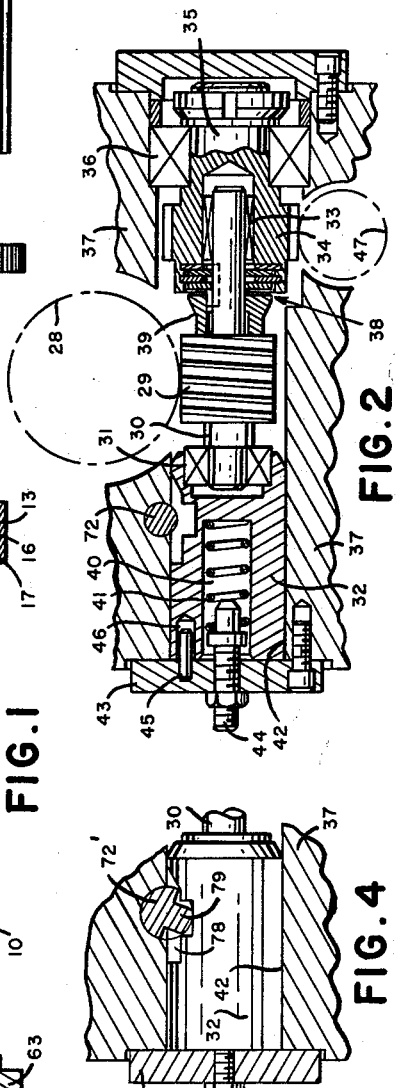
INVENTOR.
MAYNARD M. MOYER
BY
ATTORNEY.

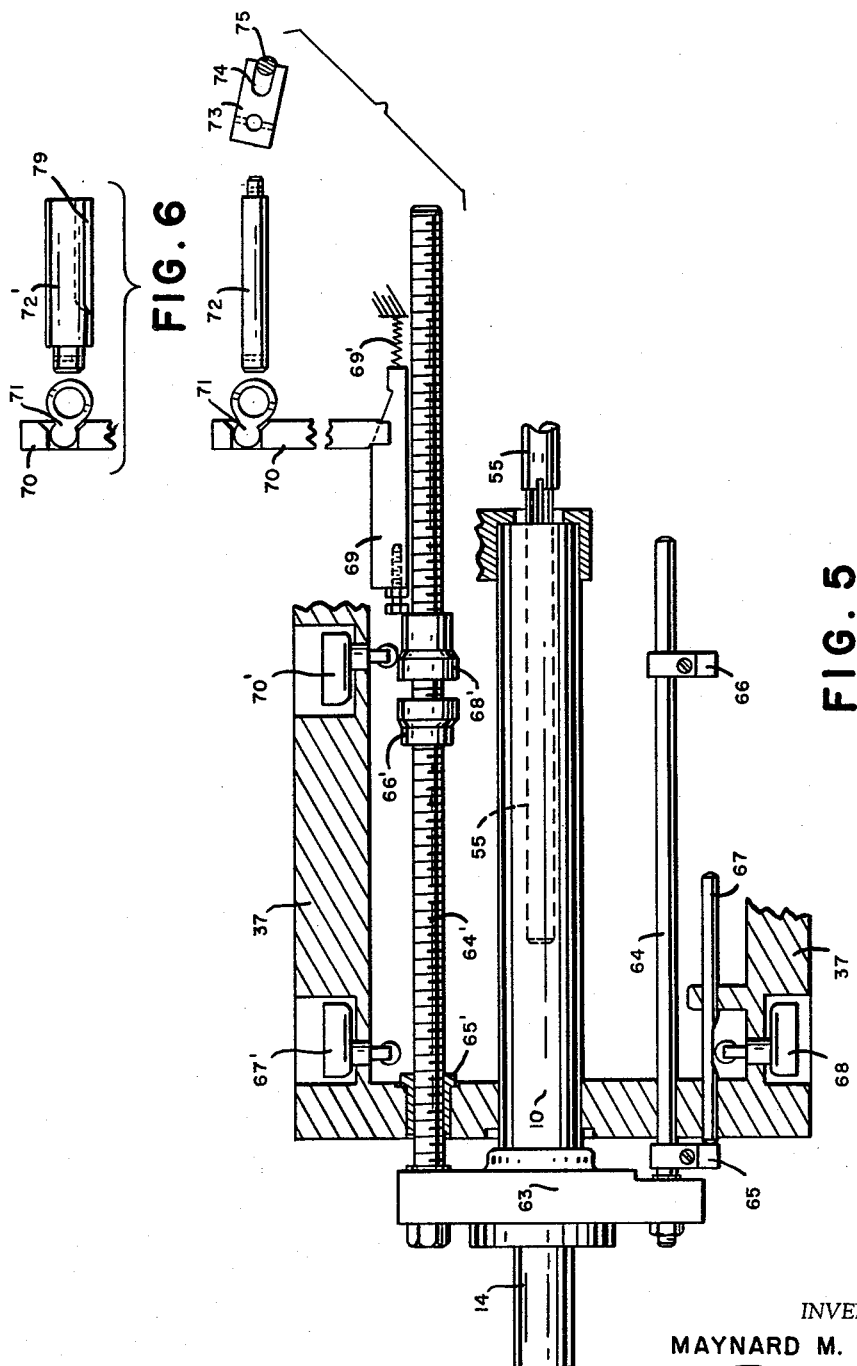

United States Patent Office 3,160,033
Patented Dec. 8, 1964

3,160,033
DRILL HEAD
Maynard M. Moyer, 5625 Rochester Road,
Rochester, Mich.
Filed Sept. 19, 1962, Ser. No. 224,653
10 Claims. (Cl. 77—34.7)

The present invention relates to machine tools and particularly to a drill head capable of feeding a rotatable spindle toward work and of traversing said spindle toward and from work.

The principal object of the invention is to provide a drill head having a spindle that is fed and rotated during a working operation by a single motor.

Another object of the invention is to provide such a drill head in which a separate reversible traverse motor is employed that overrides the feed motor during forward traversing motion of the spindle.

Still another object of the invention is to provide such a drill head in which a quill that rotatably supports a spindle is adapted to be moved to a predetermined position by a traverse motor which is stopped when the quill reaches said position, while a feed motor continues to be energized.

Another object of the invention is to provide such a drill head in which a releasable clutch is located between the feed motor and feed drive for the quill, which clutch becomes disengaged when the quill hits a positive stop.

Still another object of the invention is to provide such a drill head in which at the end of the rearward traverse motion of the quill, the releasable clutch is dis-engaged.

A further object of the invention is to provide such a drill head in which the feed movement is effected by rotating a screw, and the rapid traverse is effected by rotating a nut into which the screw is threaded.

Still another object of the invention is to provide such a drill head having a drive that is common to both the rotatable spindle and the means for feeding it.

Still another object of the invention is to provide such a drill head having a reversible, rapid traverse means separate from the spindle rotating and feed means.

In one aspect of the invention, a non-rotatable quill may be mounted for axial movement, and a rotatable spindle may be journaled in the quill for rotation relative to the quill and for axial movement therewith. A motor may be employed to rotate the spindle at different speeds through change gears.

In another aspect of the invention, the quill may be supported by a frame member that also journals a nut forming one element of a ball-screw-nut motion producing device, the screw of which is adapted to be rotated by the motor that rotates the spindle, and which motor is drivingly connected to the screw through a releasable friction clutch.

In still another aspect of the invention, a separate reversible motor drive may be provided for rapid traverse movement of the quill, and it may comprise gearing that rotatably drives the nut element of the ball-screw-nut device such that the nut element can override the feed drive of the screw thereof while the latter is still rotating.

In still another aspect of the invention, a linkage may be provided for effecting dis-engagement of the releasable clutch when the quill has been traversed rearwardly to a predetermined point.

The above, other objects and novel features of the drill head will become apparent from the following specification and accompanying drawings which are merely exemplary.

In the drawings:

FIG. 1 is a schematic showing of certain parts of a drill head to which the principles of the invention have been applied;

FIG. 2 is a sectional view taken substantially along line 2—2 of FIG. 1, and rotated counterclockwise through 90°;

FIG. 3 is a view looking in the direction of the arrows along line 3—3 of FIG. 1;

FIG. 4 is a sectional view of a portion of FIG. 2 disclosing a modified form of the invention;

FIG. 5 is a sectional plan view of certain parts of the drill head taken substantially along line 5—5 of FIG. 1;

FIG. 6 is an exploded detail; and

Figure 7:
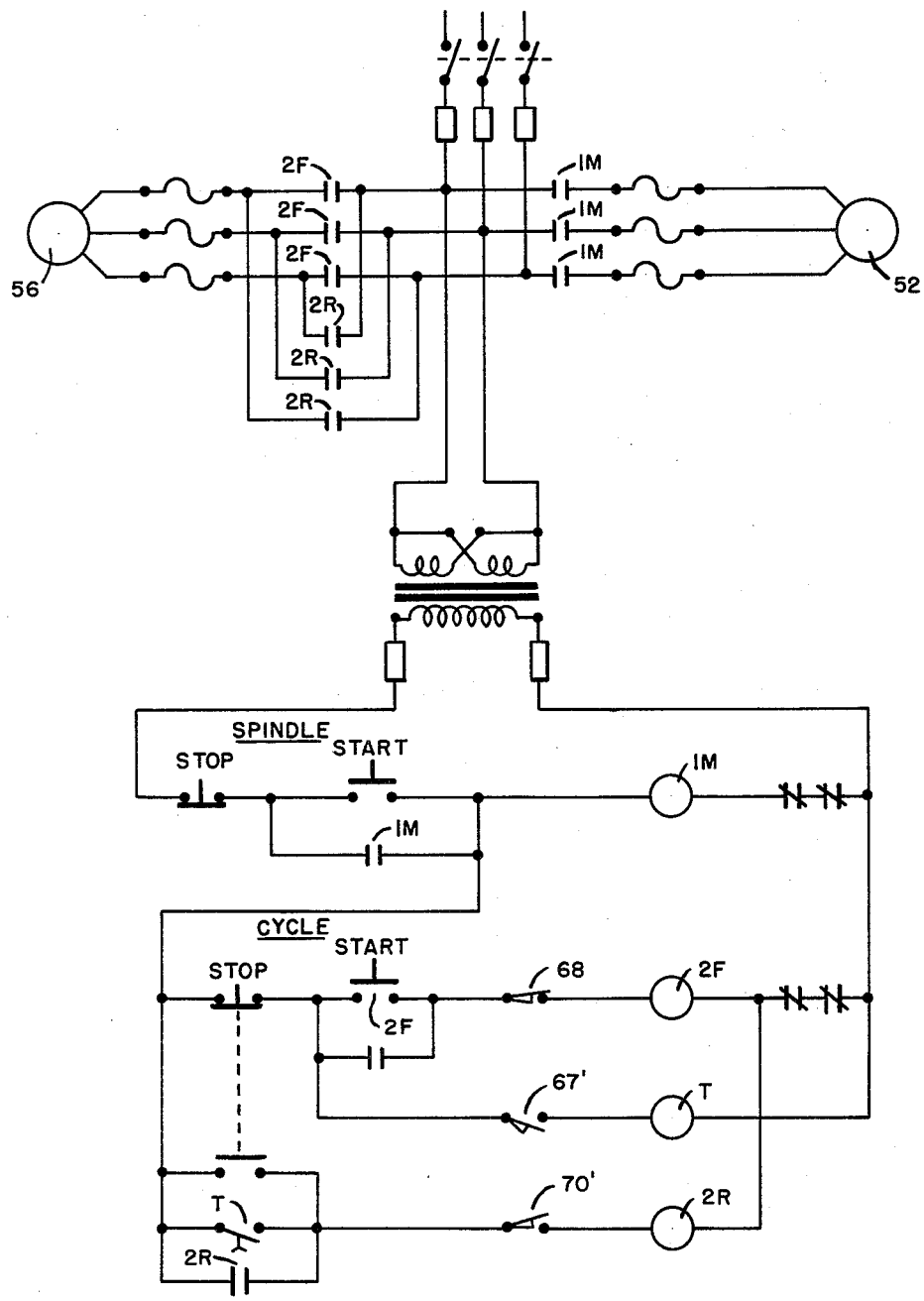
FIG. 7 is a wiring diagram for the apparatus shown.

Referring to the drawings, and particularly to FIG. 1, the principles of the invention are shown as applied to a drill head including a quill 10 having a hollow spindle 11 journaled in bearings 12 and 13 located within and at opposite ends of the quill. The one end 14 of spindle 11 is provided with a tool receiving means 15 which may take the form of a tapered bore or the like. The end of quill 10 opposite end 14 of spindle 11 may be rigidly fixed within a bore 16 of a bracket 17.

The bracket 17 may include another bore 18 in which bearings are located for journaling the sleeve portion 19 of a nut element 20. The nut element 20 may threadingly receive a screw 21 forming what is well known in the trade as a ball-nut-screw device.

The sleeve portion 19 has a spur gear 22 keyed to it that meshes with an elongated gear 23 that is normally held against rotation when the quill 10 is fed forwardly during a metal working operation. The gear 23 is rotated during the rapid traverse of the quill 10 as will be explained later.

A gear 24 is fixed to one end of screw 21 and it meshes with a gear 25 that in turn meshes with a gear 26. The gear 26 is fixed to a shaft 27 that also has fixed to it a worm wheel 28. The worm wheel 28 meshes with a worm 29 splined to a shaft 30 below and at right angles to shaft 27. Referring to FIGS. 1 and 2, shaft 30 is journaled at its one end in a bearing 31 mounted within an axially slidable sleeve 32 for a purpose to be described later. The opposite end of shaft 30 is journaled in a pilot bearing 33 within an axial bore in a helical gear 34. The gear 34 has a cylindrical extension 35 that is journaled in a bearing 36 located within a bracket 37 forming part of the frame of the drill head. A friction clutch 38 may be located between the gear 34 and a clutch member 39 fixed to worm 29 and splined to shaft 30.

The axially movable sleeve 32 that supports bearing 31 may include a bore 40 within which a compression spring 41 may be mounted. The sleeve 32 is mounted for sliding movement within a bore 42 in bracket 37 which may be closed by a plate 43 having a screw adjusting device 44 mounted thereon that permits varying the compression force of spring 41. A pin 45 fixed to plate 43 slides within a drilled hole 46 in sleeve 32 to prevent its rotation while permitting its axial movement.

During a tool feeding operation, the clutch 38 is engaged by the action of spring 41 forcing sleeve 32 rightwardly (FIG. 2) which action is permitted by the selected pitch angle of the worm 29 and worm wheel 28. Thus, the gear 34 is drivingly connected to shaft 30. The gear 34 meshes with another helical gear 47 that is fixed to a shaft 48 to which a spur gear 49 is fixed (FIG. 1). The gear 49 meshes with a gear 50 that is connected to the output shaft 51 of an electric motor 52.

From the foregoing it is evident that by employing suitable change gears 49, 50 and energizing motor 52, a drive will be established through gears 50, 49, 47, clutch 38, worm 29, worm wheel 28, gears 26, 25, 24 to screw 21. Furthermore, with nut element 20 held against rotation, bracket 17, quill 10 and spindle 11 will be fed leftwardly at a rate depending upon the various gear ratios.

Additional change gears 53, 54 may be provided between motor shaft 51 and a splined shaft 55. Shaft 55 extends into the hollow spindle 11 and is splined internally thereto. Accordingly, depending upon the ratio of the change gears 53, 54, the spindle 11 may be rotated at a predetermined speed while being fed at a predetermined rate from the same motor 52.

Rapid traverse movement of the quill 10 and spindle 11 is provided by a separate reversing motor 56 that includes a brake or plugging arrangement so that upon de-energizing of the motor, the brake automatically is applied; and upon energizing the motor 56, the brake is automatically released.

Referring again to FIG. 1, motor 56 has an output shaft 57 to which a gear 58 is keyed. Gear 58 meshes with a gear 59 journaled on shaft 27; and gear 59 meshes with a gear 60 that is journaled on a shaft 61. Gear 60 meshes with teeth 62 forming part of elongated gear 23.

From the foregoing it is evident that energizing of motor 56 will rapidly rotate gear 22 and nut element 20 so that it will be translated along screw 21 whether the latter is rotating or not. Furthermore, when motor 56 is de-energized, its brake is applied and prevents rotation of nut element 20.

The cycle of operations of the various elements of the drill head includes the rapid traverse forward movement of quill 10 with spindle 11 rotating and also with screw 21 rotating. When the tool is in a position where continued feeding motion is to be effected, the traverse motor 56 is de-energized and its brake is applied, preventing rotation of nut element 20. The continuing rotation of motor 52 and screw 21, however, continues the axial movement of quill 10 and the rotating spindle 11 until a predetermined feeding has occurred whereupon a positive stop prevents further forward feeding movement of the spindle 11. When this positive stop is engaged, the gear train 24, 25, 26 and worm wheel 28 is locked. The motor 52 continues to rotate gears 47, 34, and worm 29 having a suitable lead angle, acts on locked worm wheel 28 as a rack, moving worm 29 leftwardly (FIG. 2) against the action of spring 41 until the disks of clutch 38 separate, thereby preventing burning out of said disks as motor 52 continues to rotate the spindle 11 to clean up the cut prior to the spindle being traversed rearwardly.

There may be provided a time-delay switch that is actuated when the positive stop is engaged, which after a preset time interval energizes motor 56 to cause it to rotate reversely. Even though motor 52 continues to rotate screw 21 to feed quill 10 forwardly, it has no practical significance on the rapidly reversely rotating nut element 20 which rapidly traverses quill 10 rearwardly to the rear end of its stroke. At the rear end of the traverse stroke, other means may be provided for locking the worm wheel 28 so that worm 29 moves axially to disengage the plates of clutch 38 until a new cycle of operations is initiated.

Referring to FIG. 5, the quill 10 may include a yoke element 63. A rod 64 is fixed to the yoke 63 and adjustably supports dogs 65, 66 thereon which cooperate with a slidable rod 67 having a cam for actuating a switch 68. A threaded shaft 64' may be rigidly fixed to the one side of yoke 63, and it may slidingly extend through a bushing 65' within the forward end of the machine frame 37. A stop dog 66' may be adjustably located along threaded shaft 64' and it may actuate a switch 67' as it is positively stopped by engagement with the head of bushing 65'. When the traverse motor 56 is energized for forward rotation, quill 10 moves forwardly until dog 66 moves rod 67 to actuate switch 68 which thereby de-energizes motor 56, causing its brake to be applied and locking nut element 20 against rotation but permitting its axial movement. Since motor 52 is continuously rotating, screw 21 is also rotating so that nut element 20 and quill 10 are fed forwardly until the forward end of dog 66' engages bushing 65', positively stopping the forward movement of quill 10, and at the same time actuating the switch 67'. Switch 67' may be connected into the circuit for motor 56 and may operate a time-delay relay which, when it times out, energizes motor 56 for reverse rotation, thus permitting the tool to clean up the work performed prior to the tool spindle and quill being traversed rearwardly.

Energization of motor 56 to rotate reversely causes the quill 10 and threaded shaft 64 to move rearwardly. A stop dog 68' may be adjustably set on threaded shaft 64' to engage a slidable cam 69 prior to actuating a switch 70' that stops motor 56. As cam 69 moves rightwardly against the action of a spring 69' (FIG. 5) and downwardly (FIG. 1), it moves a link 70 upwardly, thereby rotating a crank 71 clockwise (FIG. 5) and with it a shaft 72 to which crank 71 is fixed. Referring to FIG. 1, clockwise movement of shaft 72 as viewed from its end opposite that supporting crank 71, causes the clockwise movement of another crank 73 having a bifurcated end 74 that engages a pin 75 on a spring pressed detent 76, forcing the latter into interference with a cam 77 fixed to shaft 27 that supports worm wheel 28. When this occurs, at the rearmost position of the quill 10, worm wheel 28 is locked and motor 52, still rotating, causes worm 29 to move leftwardly (FIG. 2) separating the disks of clutch 38, until another cycle of operations is initiated by the operator manually re-energizing motor 56 for rotation in a forward direction.

Referring to FIG. 7, closing spindle start pushbutton energizes relay coil 1M, closing 1M contacts thereby energizing motor 52, causing spindle 11 to rotate and the relay coil 1M to remain energized after release of the start pushbutton. Closing cycle start pushbutton energizes relay coil 2F, closing 2F contacts, energizing motor 56 to rotate in a forward direction and holding relay coil 2F energized after releasing cycle start pushbutton.

Energizing motor 56 causes the quill 10 to move leftwardly (FIG. 1) at rapid traverse rate until dog 66 actuates switch 68, de-energizing relay 2F, stopping motor 56 and applying its built-in brake. However, motor 52 continues to rotate screw 21 as well as spindle 11. This feeds spindle 11 forwardly until dog 66' closes switch 67' and contacts positive stop 65'. Closing switch 67' energizes time delay relay T which after a preset time closes time delay switch, energizing relay 2R since switch 70' is closed with spindle 11 in its forward position. Accordingly, contacts 2R close, energizing motor 56 to rotate reversely and holding said circuit after switch T opens. This causes spindle 11 to move rearwardly at rapid traverse rate until dog 68' forces cam 69 rightwardly (FIG. 5), effecting the locking of gear 28, causing clutch 38 to disengage. Shortly after cam 69 is actuated, switch 70' is opened, stopping motor 56 until the next cycle of operation.

Referring to FIGS. 4 and 6 wherein a modified form of the mechanism for disengaging the plates of clutch 38 is shown, the sleeve 32 may include a notched recess 78 within which a tongue 79 on shaft 72' may extend. In this arrangement, crank 73, detent 76 and cam 77 may be dispensed with.

As the cam 69 is moved rearwardly, it raises link 70 rotating crank 71 and shaft 72' clockwise (FIGS. 5 and 4), thereby forcing sleeve 32 against plate 43 and drawing with it shaft 30 and worm 29, effecting the disengagement of the disks of clutch 38.

Although the various feature of the drill head have been shown and described in detail to fully disclose two embodiments of the invention, it will be evident that changes may be made in such details and certain features may be used without others without departing from the principles of the invention.

What is claimed is:

1. In a drill head, a frame; a quill mounted in said frame for reciprocative motion; a spindle rotatably mounted in said quill for reciprocative movement therewith; a rotatable, axially fixed screw mounted in said frame; nut means threaded onto said screw; a housing connecting said nut means to said quill so that said quill and nut means reciprocate together; motor means; change gears between said motor means and said spindle; a gear train including other change gears between said motor means and said axially fixed screw, whereby said spindle can be rotated and said quill moved at selected rates independent of each other; a clutch within the gear train between said motor means and said axially fixed screw; and means responsive to the stopping of the reciprocative movement of said quill and the continued rotation of said motor means for disengaging said clutch.

2. In a drill head, a frame; a quill mounted in said frame for reciprocative motion; a spindle rotatably mounted in said quill for reciprocative movement therewith; a rotatable, axially fixed screw mounted in said frame; nut means threaded onto said screw; a housing connecting said nut means to said quill so that said quill and nut means reciprocate together; motor means; change gears between said motor means and said spindle; a gear train including other change gears between said motor means and said axially fixed screw, said gear train including a work and worm wheel; means mounting said worm for slight axial movement; a clutch between said motor means and said axially movable worm; and resilient means normally urging said worm to a position effecting the engagement of said clutch, the lead angle of said worm and worm wheel being such that stopping the rotation of said worm wheel causes said worm to axially move to thereby disengage said clutch.

3. In a drill head, a frame; a quill mounted in said frame for reciprocative motion; a spindle rotatably mounted in said quill for reciprocative movement therewith; a rotatable, axially fixed screw mounted in said frame; axially movable, rotatable nut means threaded onto said screw; a housing connecting said nut means to said quill so that said quill and nut means reciprocate together; motor means; change gears between said motor means and said spindle; a gear train including other change gears between said motor means and said axially fixed screw; separate reversible motor and brake means drivingly connected to said nut means, whereby said nut means is held against rotation except when said separate motor means is energized; a clutch within the gear train between said motor means and said axially fixed screw; and means responsive to the stopping of the reciprocative movement of said quill and the continued rotation of said motor means for disengaging said clutch.

4. In a drill head, a frame; a quill mounted in said frame for reciprocative motion; a spindle rotatably mounted in said quill for reciprocative movement therewith; a rotatable, axially fixed screw mounted in said frame; axially movable, rotatable nut means threaded onto said screw; a housing connecting said nut means to said quill so that said quill and nut means reciprocate together; motor means; change gears between said motor means and said spindle; a gear train including other change gears between said motor means and said axially fixed screw; a clutch within the gear train between said motor means and said axially fixed screw; means responsive to the stopping of the reciprocative movement of said quill for disengaging said clutch; and separate reversible motor and brake means drivingly connected to said nut means, whereby said nut means is held against rotation except when said separate motor means is energized.

5. In a drill head, a frame; a quill mounted in said frame for reciprocative motion; a spindle rotatably mounted in said quill for reciprocative movement therewith; a rotatable, axially fixed screw mounted in said frame; axially movable, rotatable nut means threaded onto said screw; a housing connecting said nut means to said quill so that said quill and nut means reciprocate together; motor means; change gears between said motor means and said spindle; a gear train including other change gears between said motor means and said axially fixed screw, said gear train including a worm and worm wheel; means mounting said worm for slight axial movement; a clutch between said motor means and said axially movable worm; resilient means normally urging said worm to a position effecting the engagement of said clutch, the lead angle of said worm and worm wheel being such that stopping the rotation of said worm wheel causes said worm to axially move to thereby disengage said clutch; and separate reversible motor and brake means drivingly connected to said nut means, whereby said nut means is held against rotation except when said separate motor means is energized.

6. In a drill head, a frame; a quill mounted in said frame for reciprocative motion; a spindle rotatably mounted in said quill for reciprocative movement therewith; a rotatable, axially fixed screw mounted in said frame; rotatable nut means threaded onto said screw; a housing connecting said nut means to said quill so that said quill and nut means reciprocate together; feed motor means; gear train means drivingly connecting said screw and said spindle to said feed motor means; clutch means within said gear train means; means responsive to the stopping of said gear train for disengaging said clutch means; reversible traverse motor means drivingly connected to said nut means; adjustable means responsive to the movement of said quill during its forward movement for de-energizing said traverse motor means while said feed motor means continues to feed said quill forwardly; other adjustable means responsive to the movement of said quill; positive stop means adapted to engage said other adjustable means; and means operated upon by the positive stopping of said quill for re-energizing said traverse motor for reverse rotation.

7. In a drill head, a frame; a quill mounted in said frame for reciprocative motion; a spindle rotatably mounted in said quill for reciprocative movement therewith; a rotatable, axially fixed screw mounted in said frame; rotatable nut means threaded onto said screw; a housing connecting said nut means to said quill so that said quill and nut means reciprocate together; feed motor means; gear train means drivingly connecting said screw and said spindle to said feed motor means; clutch means within said gear train means; means responsive to the stopping of said gear train for disengaging said clutch means; reversible traverse motor means drivingly connected to said nut means; adjustable means responsive to the movement of said quill during its forward movement for de-energizing said traverse motor means while said feed motor means continues to feed said quill forwardly; other adjustable means responsive to the movement of said quill; positive stop means adapted to engage said other adjustable means; means operated upon by the positive stopping of said quill for re-energizing said traverse motor for reverse rotation; and adjustable means responsive to the rearward traverse movement of said quill for stopping said traverse motor means.

8. In a drill head, a frame; a quill mounted in said frame for reciprocative motion; a spindle rotatably mounted in said quill for reciprocative movement therewith; a rotatable, axially fixed screw mounted in said frame; rotatable nut means threaded onto said screw; a housing connecting said nut means to said quill so that said quill and nut means reciprocate together; feed motor means; gear train means drivingly connecting said screw and said spindle to said feed motor means; clutch means within said gear train means; means responsive to the stopping of said gear train for disengaging said clutch means; reversible traverse motor means drivingly connected to said nut means; adjustable means responsive to the movement of said quill during its forward movement for de-energizing said traverse motor means while said feed motor means continues to feed said quill forwardly; other adjustable means responsive to the movement of said quill; positive stop means adapted to engage said other adjustable means; means operated upon by the positive stopping of said quill for re-energizing said traverse motor for reverse rotation; and adjustable means responsive to the rearward traverse movement of said quill for stopping the gear train of said feed motor means to disengage said clutch means and for de-energizing said traverse motor means.

9. In a drill head, a frame; a quill mounted in said frame for reciprocative motion; a spindle rotatably mounted in said quill for reciprocative movement therewith; a rotatable, axially fixed screw mounted in said frame; rotatable nut means threaded onto said screw; a housing connecting said nut means to said quill so that said quill and nut means reciprocate together; feed motor means; gear train means drivingly connecting said screw and said spindle to said feed motor means; clutch means within said gear train means; means responsive to the stopping of said gear train for disengaging said clutch means; reversible traverse motor means drivingly connected to said nut means; adjustable means responsive to the movement of said quill during its forward movement for de-energizing said traverse motor means while said feed motor means continues to feed said quill forwardly; other adjustable means responsive to the movement of said quill; positive stop means adapted to engage said other adjustable means; means operated upon by the positive stopping of said quill for re-energizing said traverse motor for reverse rotation; cam means rendered effective by the rearward traverse movement of said quill for stopping the gear train of said feed motor means to disengage said clutch means; and switch means operated by the rearward movement of said quill for de-energizing said traverse motor means.

10. In a drill head, a frame; a quill mounted in said frame for reciprocative motion; a spindle rotatably mounted in said quill for reciprocative movement therewith; a rotatable, axially fixed screw mounted in said frame; ball-nut means threaded onto said screw; a housing connecting said ball-nut means to said quill so that said quill and nut means reciprocate together; feed motor means; gear train means drivingly connecting said screw and said spindle to said feed motor means; clutch means within said gear train means, said gear train means including a worm wheel and an axially movable worm gear; means for connecting said clutch means to said worm gear; resilient means normally urging said worm gear in a direction causing engagement of said clutch means, the lead angle of said worm gear and worm wheel being such that upon stopping said gear train, said worm gear moves axially to disengage said clutch means; reversible traverse motor means drivingly connected to said ball-nut means; adjustable means responsive to the movement of said quill during its forward movement for de-energizing said traverse motor means while said feed motor means continues to feed said quill forwardly; other adjustable means responsive to the movement of said quill; positive stop means adapted to engage said other adjustable means; and means operated upon by the positive stopping of said quill for re-energizing said traverse motor for reverse rotation.

References Cited in the file of this patent
UNITED STATES PATENTS

| | | |
|---|---|---|
| 2,796,767 | Carpenter | June 25, 1957 |
| 3,068,713 | Davis | Dec. 18, 1962 |
| 3,075,415 | Dabringhaus | Jan. 29, 1963 |